United States Patent
Levy et al.

[15] 3,671,629
[45] June 20, 1972

[54] STERILIZING COMPOSITION COMPRISING POTASSIUM MONOPERSULPHATE AND SODIUM CHLORIDE COATED WITH AN EDIBLE OIL AND MAGNESIUM STEARATE

[72] Inventors: Alan A. Levy, Stanmore; Mitchell N. Rodger, High Wycombe; Geoffrey D. Breach, South Norwood, London, all of England

[73] Assignee: Richardson-Merrell Limited, London, England

[22] Filed: Feb. 16, 1968

[21] Appl. No.: 705,940

[30] Foreign Application Priority Data

Feb. 21, 1967  Great Britain..........................8,308/67

[52] U.S. Cl....................................424/153, 424/38, 424/53
[51] Int. Cl. .........................................................A01n 17/00
[58] Field of Search ....................424/38, 53, 153, 31; 252/99

[56] References Cited

UNITED STATES PATENTS

| | | | |
|---|---|---|---|
| 1,704,727 | 3/1929 | Connell | .....................424/31 |
| 3,244,596 | 4/1966 | Lach | ..........................424/38 |
| 3,459,665 | 8/1969 | Schiefer et al. | ....................252/99 X |

OTHER PUBLICATIONS

Remington's Pharmaceutical Sciences, (1965), pp. 842 and 872 DuPont Bulletin " Oxone" (Jan. 1961) pp. 3– 6 and 10

*Primary Examiner*—Albert T. Meyers
*Assistant Examiner*—Norman A. Drezin
*Attorney*—Wenderoth, Lind & Ponack

[57] ABSTRACT

In order to maintain uniformity of composition when fed into small packages from bulk, the individual particles of the salts in a solid water soluble sterilizing composition, containing an alkali metal monopersulphate and an alkali metal chloride, are coated with a non-aqueous physiologically acceptable liquid, such as corn oil or medicinal paraffin, and a solid anti-static lubricant, such as magnesium stearate.

7 Claims, No Drawings

STERILIZING COMPOSITION COMPRISING POTASSIUM MONOPERSULPHATE AND SODIUM CHLORIDE COATED WITH AN EDIBLE OIL AND MAGNESIUM STEARATE

The present invention relates to sterilizing compositions and in particular to sterilizing compositions for releasing chlorine over extended periods, when in aqueous solution.

It has long been the practice to sterilize infants' feeding bottles by utilizing dilute solutions of sodium hypochlorite. This is a very satisfactory method, but has the inconvenience that the active material can only be stored in the form of a solution. It has the great advantage that at the recommended dilution it is substantially non-toxic so that it is immaterial if residues are left in the feeding bottle.

It is an object of the present invention to retain the advantages associated with the known material referred to above, while at the same time overcoming the inconvenience and expense associated with packaging and transporting sodium hypochlorite solution.

We have found that a satisfactory available chlorine concentration can be maintained over a prolonged period for sterilizing infants' feeding bottles by forming a solution in water of an alkali metal monopersulphate, preferably potassium monopersulphate, $KHSO_5$, and an alkali metal chloride, preferably sodium chloride. To maintain the release of chlorine at a sufficient rate over a period of at least 24 hours the ratio of the two active ingredients should be in the ratio of 1 part of monopersulphate to 2-30 parts alkali metal chloride. Preferably sodium chloride is employed in amounts of 12-20 parts per part of potassium monopersulphate. A dry composition including potassium monopersulphate and sodium chloride in the above quoted ratios should be utilized in amounts sufficient to provide about 0.15 grams potassium monopersulphate per pint of water when applied to the sterilization of infants' feeding bottles, i.e. to provide about 100 p.p.m. of total oxidizing power, measured as available chlorine.

In order to be of practical utility for the desired purpose it is necessary to be able to pack the dry mixture in individual sachets. In order to ensure that there is a satisfactory amount of each of the active ingredients in the individual sachets, it is necessary for the dry composition to be in the form of a stable mixture; that is to say a mixture of which the individual components do not segregate in the course of passing through filling machinery to the sachets. It is however found that the components of a simple mixture of commercially available potassium monopersulphate and sodium chloride in the proportions above stated segregate very rapidly in being passed through conventional filling cones with the result that widely differing amounts of potassium monopersulphate would be present in the individual sachets.

Commercially available potassium monopersulphate contains about 45 percent potassium monopersulphate in admixture with potassium sulphate and potassium hydrogen sulphate.

The present invention provides a stable composition containing the potassium monopersulphate mix and an alkali metal chloride, preferably sodium chloride, in the proportions above quoted and the present invention also further provides a process for the production of such a stable composition.

According to the present invention a solid sterilizing composition for solution in water comprises a dry mixture of an alkali metal monopersulphate and an alkali metal chloride in proportions of 1:2-30 together with sufficient neutralizing agent, such as sodium bicarbonate or potassium bicarbonate, to hold the pH value of the solution at pH 4-9, preferably pH 6.5-7.5 when in a solution containing about 100 parts per million of total oxidizing power measured as available chlorine, at least the particles of alkali metal monopersulphate and alkali metal chloride being coated with a liquid non-aqueous, physiologically acceptable coating material and an anti-static solid lubricant, preferably magnesium stearate. The solid lubricant must have high surface covering properties and moisture repellent properties, in addition to anti-static properties.

The upper limit of the solid lubricant is in practice governed by the requirement that it should disperse substantially completely when the contents of a sachet are dissolved in the proper quantity of water, so that no scum is formed. Since the required amount of magnesium stearate is extremely small (of the order of 0.005 percent) the amount that is added is in fact governed by the requirement that substantially no scum shall form when the contents of a sachet are dissolved in water. The minimum quantity of solid lubricant is determined by the requirement that there shall be sufficient present to perform an anti-static and moisture repelling functions and it is believed that it is sufficient to incorporate magnesium stearate in amounts in the range of 0.001 to 0.01 percent in order to comply with the requirements.

While various other non-aqueous liquid coating compounds have been tested it has been found that corn oil and medicinal paraffin oil are highly satisfactory as the primary coating liquids. Both these materials are substantially non-toxic and entirely harmless when present in or on the water in which the sterilizing composition is dissolved. Other edible vegetable oils and physiologically-acceptable liquid hydrocarbons and also long chain fatty alcohols and physiologically-acceptable silicone fluids can be used for the purpose, provided that they are resistant to the oxidizing action of the constituents. The lower limit of the liquid coating compound is determined by the fact that the solid particles should be entirely coated and it is preferred to operate as near this level as possible. Typically the coating compound forms 0.02-0.1 percent of the solid composition. If the upper figure given is much exceeded then there are solution difficulties with the active ingredients and again there would be a tendency to form an oily film on the water, which should preferably be avoided.

The sterilizing composition contains a neutralizing agent as already explained. The preferred neutralizing agent is sodium bicarbonate in an amount of 2½–10 percent, the amount in fact being governed by the relative proportions of monopersulphate and chloride. It is preferred that both the chloride and sodium bicarbonate should be extremely finely divided, since this assists in the formation of stable mixtures containing the coarsely granular potassium monopersulphate.

One example of a sterilizing composition of the present invention is as follows:

| | % w/w |
|---|---|
| Commercial Potassium monopersulphate (contains about 45% active material) | 11.000 |
| Pure vacuum dried sodium chloride, 60-mesh | 83.966 |
| Sodium bicarbonate BP | 5.000 |
| Magnesium stearate BP | 0.004 |
| Corn (maize) oil | 0.030 |

The preparation of this preferred composition may be effected by mixing the sodium chloride with one third of the corn oil in a mixer for about 5 minutes, to coat the sodium chloride particles, followed by addition of potassium monopersulphate mix and the remainder of the corn oil and further mixing for 2-5 minutes to coat the potassium monopersulphate mix (commercial potassium monopersulphate) particles. When the mixing is complete to effect coating of the sodium chloride and potassium monopersulphate mix particles, sodium bicarbonate and magnesium stearate are added and further mixed for 5-10 minutes to produce a substantially homogeneous free-flowing dry mixture, the particles of which all carry the same charge, so that they do not immediately segregate. In addition to its function as a neutralising agent, very fine sodium bicarbonate powder assists in filling the interstitial spaces between the rather coarse particles of commercial potassium monopersulphate. The sodium chloride used is also preferably of a fine particle size for the same reason. 60 mesh vacuum-dried sodium chloride is very suitable for the present purpose. In this product the ratio of active potassium monopersulphate to sodium chloride is approximately 1:17.

The product is, when suitably packaged, an extremely stable, very homogeneous, white, free-flowing powder, with only a faint odor of corn oil. It is very soluble in water.

When packaged in foil/acetate laminate, the solid composition is completely stable at room temperature (6 months), 37°C (6months) and 41°C/75 percent relative humidity (4 months). It is essential, however, that the potassium monopersulphate used should be very dry initially (ca 0.2 percent moisture).

Solution of the composition at the rate of 5 gms/liter was made up and at regular intervals a 10 ml aliquot withdrawn and tested for bactericidal activity.

The 10 ml aliquot was inoculated with 1 ml of a suspension of Escherischia coli in distilled water at approximately $10^6$–$10^7$ organisms/ml. After a contact time of 30 secs. and 1 minute 1 ml samples were removed, neutralized with sodium thiosulphate and plated. (Nutrient agar (OXOID) incubation overnight at 37°C.). The test was carried out at 20°C.

| AGE OF SOLUTION | CONTACT TIME | GROWTH *CODE |
|---|---|---|
| 1 min. | 30 secs. | 3 |
|  | 60 secs. | 3 |
| 3 mins. | 30 secs. | 2 |
|  | 60 secs. | 1 |
| 5 mins. | 30 secs. | 1 |
|  | 60 secs. | 0 |
| 10 mins. | 30 secs. | 0 |
|  | 60 secs. | 0 |
| 15 mins. | 30 secs. | 0 |
|  | 60 secs. | 0 |

*CODE   0 = 0   – colonies/plate
        1 = 10  – 100 colonies/plate
        3 =     <500 colonies/plate A solution of the composition 5 minutes old was found to kill i.e. Code 0 *E. coli, Aerobacter aerogenes, Micrococcus pyogenes (Var.aureus). Pseudomonas aeruginosa* and *Candida albicans* with a contact time of 1 minute and original inoculum of $10^6$–$10^7$ organisms/ml.

10 ml of the solution was inoculated with 1 ml of the organism in suspension in water. After a contact time of 1 minute 1 ml samples were removed, neutralized with sodium thiosulphate, and plated (Nutrient agar (Oxoid) incubation overnight at 37°C). All tests were carried out at 20°C.

Infants feeding bottles were soiled with contaminated milk and then soaked one at a time in the solution for periods from 5 mins. to 3 hours.

The bottles were contaminated by using 5 ml of milk with 0.5 ml of overnight broth culture of *E. coli*.

This inoculum was distributed over the entire inner surface of the bottle and the excess tipped away. The bottle was then laid in the incubator at 37°C, until the milk film had dried (approx. 30 mins.). The bottles were then immersed in the solution and removed at intervals. On removal the bottles were drained, and roller rinses made with 25 ml of sterile N/100 thiosulphate.

3 separate 1 ml. samples were plated from the rinse solutions. No organisms were isolated on any plate.

The sterilizing composition is very advantageous for sterilizing infants' feeding bottles, particularly because of the slow reaction of the active ingredients with milk residues, so that the solution remains active over a long period.

The use of the composition of the present invention is not confined to sterilization of infants' feeding bottles. The same composition, preferably with added flavoring and coloring agents, such as menthol and riboflavin, may be used as a mouth wash in a solution of the same strength as indicated above.

The composition of the present invention may be formed into tablets. Such tablets may be utilized for a variety of purposes, such as the sterilization of personal water supplies. It will be understood that the stabilization of the composition is just as important for the purpose of obtaining tablets of uniform composition as it is for the production of sachets having contents of uniform composition.

All parts and percentages stated herein are by weight except where the context requires otherwise.

We claim:

1. A solid sterilizing composition comprising a mixture of dry particles of potassium monopersulphate and sodium chloride in the proportion of 1:2–30 together with a sufficient amount of sodium bicarbonate or potassium bicarbonate to hold the pH value of the solution within the range of 4 to 9 when in aqueous solution containing 100 parts per million of total oxidizing power measured as available chlorine, the particles of potassium monopersulphate and sodium chloride being coated with an edible vegetable oil or medicinal paraffin oil forming 0.02 to 0.1 percent of the composition, and magnesium stearate as a moisture-repelling anti-static solid lubricant having high covering power in an amount of 0.001 to 0.01 percent of said composition, said vegetable oil or medicinal paraffin oil completely coating said particles of potassium monopersulphate and sodium chloride.

2. A composition according to claim 1 wherein the dry mixture is in the form of a free-flowing dry powder, the bicarbonate is sodium bicarbonate and the oil is corn oil or medicinal paraffin oil.

3. A composition according to claim 1, wherein the said bicarbonate is in sufficient quantity to hold the pH value of the solution within the range pH 6.5–7.5.

4. A composition according to claim 1, wherein the oil is corn oil.

5. A composition according to claim 1 wherein the dry mixture is in the form of a free-flowing dry powder.

6. A composition according to the claim 1 in which the sodium chloride is present in amounts of 12–20 parts per part of potassium monopersulphate.

7. A composition according to claim 1, in which the sodium chloride has a particle size of 60 mesh.

* * * * *